United States Patent
Tani

[19]
[11] Patent Number: 6,118,755
[45] Date of Patent: Sep. 12, 2000

[54] OPTICAL DISK DEVICE

[75] Inventor: Takao Tani, Osaka, Japan

[73] Assignee: Funai Techno-Systems Co., Ltd., Osaka, Japan

[21] Appl. No.: 09/145,615

[22] Filed: Sep. 2, 1998

[30] Foreign Application Priority Data

Sep. 2, 1997 [JP] Japan ................................. 9-008356

[51] Int. Cl.[7] ......................................... G11B 7/24
[52] U.S. Cl. ..................... 369/275.3; 369/32; 369/58
[58] Field of Search .......................... 369/275.3, 275.1, 369/275.4, 275.5, 13, 32, 58, 54, 47, 94

[56] References Cited

U.S. PATENT DOCUMENTS 5,881,032  3/1999  Ito et al. ..................................... 369/32

FOREIGN PATENT DOCUMENTS

| 59-146446 | 8/1984 | Japan . |
| 5-189868 | 7/1993 | Japan . |
| 6-162734 | 6/1994 | Japan . |
| 8-7534 | 1/1996 | Japan . |
| 9-27154 | 1/1997 | Japan . |

*Primary Examiner*—Ali Neyzari
*Attorney, Agent, or Firm*—Morgan, Lewis & Bockius LLP

[57] ABSTRACT

An optical disk device for writing onto an optical disk to allow invisible data to be written thereon. The optical disk device has an address detection section for detecting the last address of invisible data based on the last address recorded in an address information area and the last address of a user data area of the optical disk when an optical disk is replaced with another optical disk, an instruction data calculation section for finding address instruction data indicating the top address of an empty area from the last address detected by the address detection section, and a storage section for storing the address instruction data found by the instruction data calculation section. When writing is executed, it is executed starting at the top address corresponding to the address instruction data stored in the storage section.

3 Claims, 3 Drawing Sheets

OPTICAL DISK DEVICE

BACKGROUND OF THE INVENTION

1. Field of the Invention

This invention relates to an optical disk device for writing onto an optical disk to allow writing of invisible data whose record address is not registered in an address information area in which record addresses of written data are registered.

2. Description of the Related Art

Even if data recording is temporarily suspended, a writable optical disk such as a write once optical disk enables data recorded after the suspension to be integrated with the data recorded before the suspension. Thus, if data recording is temporarily suspended, the data recorded before the suspension is not registered in an area indicating data record information in track units, which will be hereinafter referred to as PMA (program memory area). This means that the data recorded before the suspension is data that cannot be referenced from PMA information, which will be hereinafter referred to as invisible data. Therefore, when writing is started, it needs to be executed from the end address of the invisible data and the last address of the invisible data needs to be known.

Thus, when a write instruction is given, the operation of detecting the last address of the invisible data is performed. That is, an address is found by making a binary search from the last address indicated in the PMA information and the last address of a user data area and whether or not data is recorded at the found address is determined. If data (invisible data) is recorded at the found address, continuous reading is started. When header information provided by the continuous reading indicates the end of the invisible data, the last address of the invisible data is found from the address of the end block.

The operation of finding the last address requires time of two to three seconds. Therefore, when writing is executed, the time to find the last address and the time to actually write data are required and the write speed slows down when viewed from the outside of the device.

On the other hand, related arts for shortening the write time by previously obtaining the write start address are proposed in Japanese Patent Unexamined Publication No. Sho. 59-146446 (first related art) and Japanese Patent Unexamined Publication No. Hei. 5-189868 (second related art). That is, in the first related art, detection means for determining whether or not data is recorded in each sector of an optical disk and storage means for storing information indicating whether or not data is recorded in a memory area related to each sector are provided. While writing is not executed, the presence or absence of data is detected for each sector and the detection result is stored in the storage means. Therefore, when writing is executed, whether or not data is recorded in the sector instructed to be written on is determined based on the information stored in the storage means and when data is not recorded, data is written. In the second related art, a volume name and last write address storage section is provided. At the termination of data writing, the last write address is stored in the volume name and last write address storage section. Therefore, the address at which the next writing is to be executed becomes one plus the last write address stored in the volume name and last write address storage section. Thus, the address at which writing is to be executed is found simply by adding one to the last write address stored in the volume name and last write address storage section. This means that the time to find the write address is extremely shortened.

However, the related arts introduce the following problems: In the first related art, while writing is not performed, whether or not data is recorded is determined for each sector and the determination result is stored in the storage means. On the other hand, an optical disk has a large storage capacity. Thus, if the capacity of one sector is lessened, the number of sectors becomes extremely large and therefore a wide area needs to be reserved as the memory area of the storage means. In contrast, if one sector is made a wide area for lessening the number of sectors to narrow the memory area of the storage means, the probability that a large empty area will occur in each sector becomes high and the use efficiency of the data record area lowers.

In the second related art, previously registered volume names and last write addresses are stored in a one-to-one correspondence with each other. At the termination of writing, the last write address is stored. Therefore, to write onto an optical disk containing no volume names registered in the volume name and last write address storage section, the stored last write address cannot be used. If even an optical disk containing a volume name registered in the volume name and last write address storage section is written on by a different device, the last write address stored in the volume name and last write address storage section is not updated. Resultantly, it is feared that data will be a gain written onto the data written by the different device, destroying the data.

SUMMARY OF THE INVENTION

It is therefore an object of the invention to provide an optical disk device that can find and store the last address of invisible data from the last address stored in an address information area and the last address of a user data area when an optical disk is replaced, thereby preventing increasing of a memory area for storing addresses where data can be written and preventing write speed when viewed from the outside of the device from lowering.

In order to achieve the above object, according to the invention, there is provided an optical disk device for writing data onto an optical disk, along spiral tracks, to allow writing of invisible data whose record address is not registered in an address information area in which record addresses of written data are -registered, the optical disk device comprising: an address detection section, when an optical disk is replaced with another optical disk, for detecting a last address of the invisible data based on a last address of record addresses recorded in the address information area of the optical disk to replace and a last address of a user data area of the optical disk; an instruction data calculation section for calculating address instruction data corresponding to a top address of an empty area into which no data is written from the last address detected by the address detection section; and a storage section for storing the address instruction data found by the instruction data calculation section, wherein when writing is executed, it is executed starting at the top address corresponding to the address instruction data stored in the storage section.

That is, when an optical disk is replaced, the address instruction data is stored in the storage section by performing a sequence of the operation steps. Therefore, data is written starting at the top address of an empty area simply by writing starting at the top address corresponding to the address instruction data. This means that when writing is executed, it becomes unnecessary to newly find the top address of an empty area. Resultantly, the time required for the write operation is only the actual data writing time.

DETAILED DESCRIPTION OF THE PREFERRED EMBODIMENT

Referring now to the accompanying drawings, there is shown a preferred embodiment of the invention.

Figure 1:
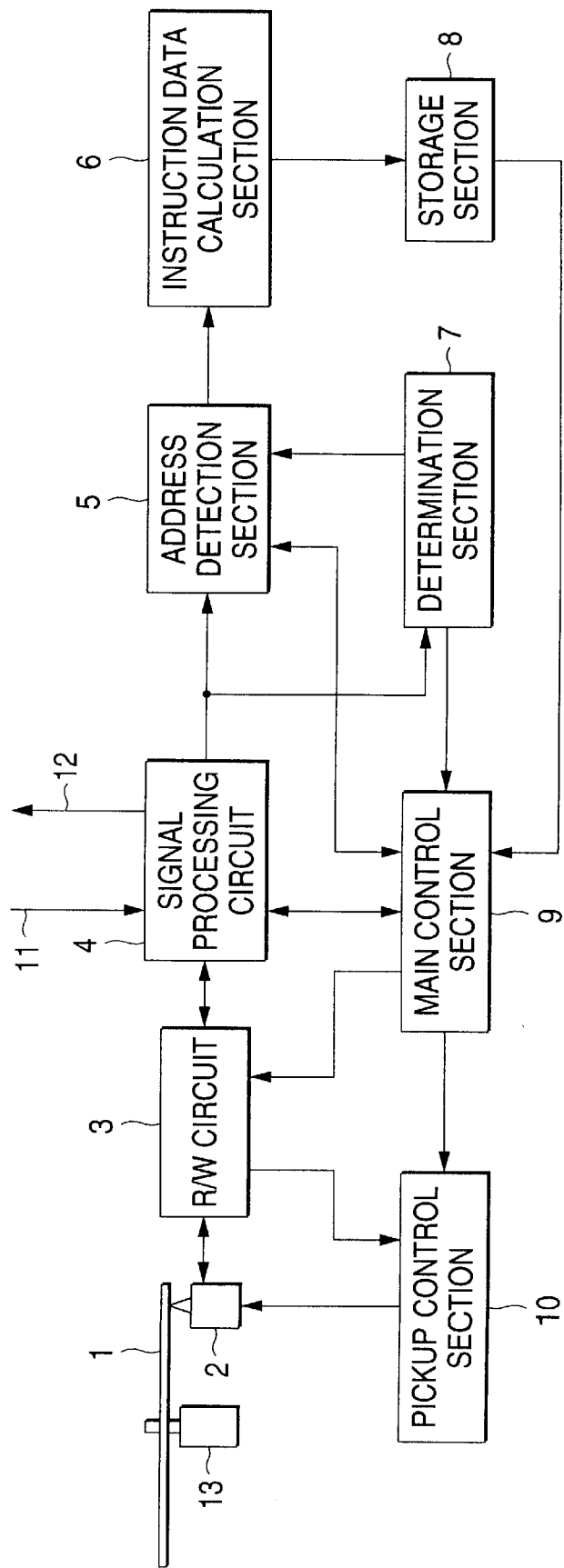
FIG. 1 is a block diagram to show an electric configuration of one embodiment of an optical disk device according to the invention.

FIG. 1 is a block diagram to show an electric configuration of one embodiment of an optical disk device according to the invention.

In FIG. 1, an optical disk 1 specifically is a CD-R or a CD-RW and an optical disk onto which data is written along spiral tracks. It allows writing of invisible data whose record address is not registered in an address information area in which record addresses of written data are registered. In the embodiment, data is also read from a CD-ROM which is a read-only optical disk onto which data is not written. Therefore, the optical disk 1 is a CD-ROM in some cases.

A pickup 2 is a block comprising a light emitting element of a laser beam, a light receiving element for receiving the laser beam reflected by the optical disk 1, and optical elements such as a light gathering lens, etc., for writing data onto the optical disk 1 and reading data written on the optical disk 1.

An R/W circuit 3 is a block for outputting a write signal to the pickup 2 at the data writing time, performing amplifying, waveform shaping, etc., of output of the pickup 2 at the data reading time, and outputting a tracking error signal, a focus error signal, etc., of the pickup 2 to a pickup control section 10 described later.

A signal processing circuit 4 is a block for performing predetermined encoding processing for data introduced on a signal line 11 and outputting write data provided by the encoding processing to the R/W circuit 3 at the data writing time, performing predetermined decoding processing for a signal output from the R/W circuit 3 and outputting data provided by the decoding processing to the outside over a signal line 12 at the data reading time. It also outputs the data provided by the decoding processing to an address detection section 5 and a determination section 7 described later.

The address detection section 5 is a block for detecting the last address of invisible data. That is, when a main control section 9 described later indicates that an optical disk has been replaced with another optical disk 1 and the determination section 7 indicates that this optical disk 1 is writable, the address detection section 5 detects the last address of invisible data based on the last value of the record addresses stored in an address information area of the optical disk 1 and the last address of a user data area and sends the detected last address to an instruction data calculation section 6 described just below.

The instruction data calculation section 6 is a block for finding address instruction data corresponding to the top address of an area into which data is not written (empty area) from the last address detected by the address detection section 5 and sending the found address instruction data to a storage section 8 described later. That is, when the address instruction data is the value of the top address of the empty area, the instruction data calculation section 6 adds one to the last address found by the address detection section 5 and sends the addition result to the storage section 8. When the address instruction data is the last address of invisible data, the instruction data calculation section 6 sends the last address found by the address detection section 5 to the storage section 8 with no change.

In the embodiment, the address instruction data indicates the value of the top address of the empty area.

The storage section 8 is a block for storing the address instruction data found by the instruction data calculation section 6. That is, the address instruction data consists of three values of a value indicating minutes, a value indicating seconds, and a value indicating a frame. Thus, the storage section 8 comprises a 3-byte memory area.

The determination section 7 is a block for determining whether or not the optical disk 1 is writable from predetermined information in the data output from the signal processing circuit 4. That is, it determines whether the optical disk 1 is a writable optical disk 1 such as a CD-R or a CD-RW or a CD-ROM that cannot be written on, and outputs the determination result to the address detection section 5 and the main control section 9.

The pickup control section 10 is a block for controlling tracking and focus of the pickup 2 and controlling the pickup 2 so as to move to a track instructed by the main control section 9.

The main control section 9 is a block for controlling the main operation of the optical disk device. That is, it changes the operation of the R/W circuit 3 and the operation of the signal processing circuit 4 to the write operation or the read operation. At the writing time, the main control section 9 instructs the top address corresponding to the address instruction data stored in the storage section 8 to the pickup control section 10. At the reading time, it instructs the address at which read data is recorded to the pickup control section 10 and stores read TOC information, etc.

Figure 2:
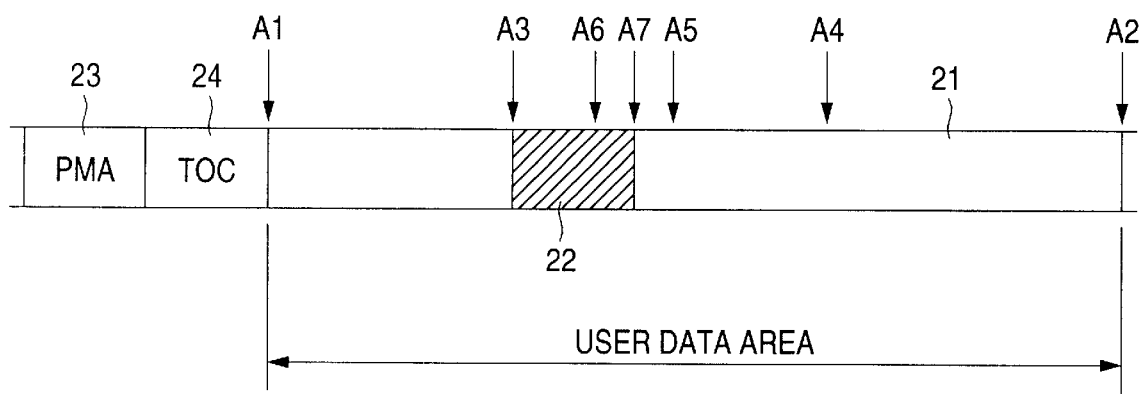
FIG. 2 is an explanatory view to show a data format on an optical disk.
Figure 3:
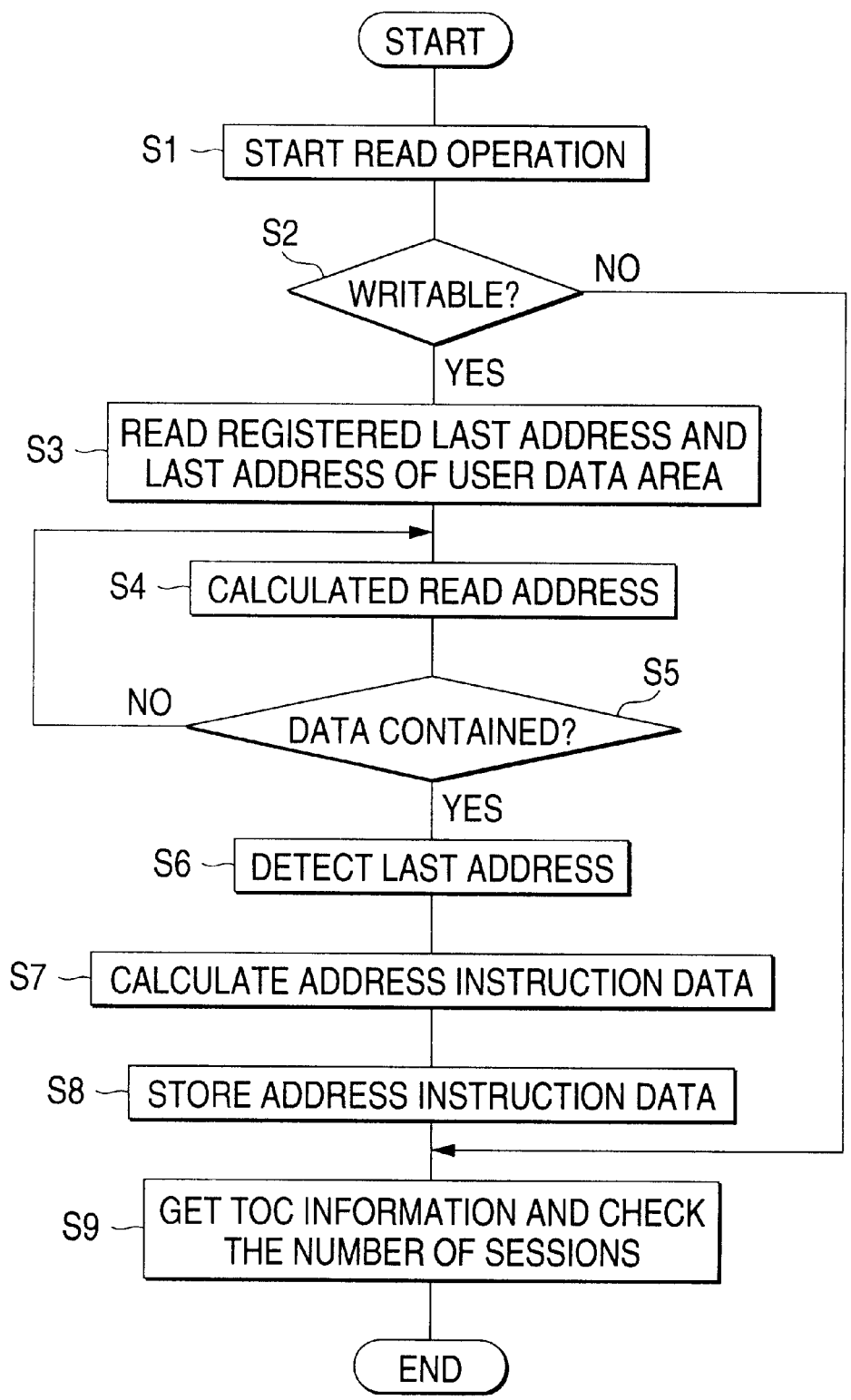
FIG. 3 is a flowchart to show the initialization operation accompanying optical disk replacement.

FIG. 2 is an explanatory view to show a data format on the optical disk 1. FIG. 3 is a flowchart to show the initialization operation accompanying optical disk replacement. The operation of the embodiment will be discussed with reference to the figures as required.

A CD-R or CD-RW is provided with a program memory area (PMA) 23 indicating record addresses in track units as an address information area in which record addresses of written data are registered. A TOC 24 is provided for compatibility with a CD-ROM. It is followed by a user data area.

Now assume that an optical disk is replaced with another optical disk 1 of a CD-R or CD-RW and that data closed as a file is already written into start address A1 to address A3 of the user data area of the optical disk 1 to replace. Therefore, the record addresses of the data at the address A1 to the address A3 are registered in the PMA 23. Assume that data 22 not closed as a file is written into the area from address A3 to address A7. Since the file is not closed, the data 22 is invisible data whose record addresses are not registered in the PMA 23.

When an optical disk is replaced with the above-mentioned optical disk and this optical disk is set at a predetermined position, optical disk replacement is indicated by a tray switch (not shown). Thus, the main control section 9 controls a spindle motor 13 so as to rotate the spindle motor 13. When detecting the spindle motor 13 rotating at predetermined speed, the main control section 9 instructs the R/W circuit 3 and the signal processing circuit 4 to start the read operation at step S1.

Resultantly, information indicating the disk type recorded on the optical disk 1 is sent through the pickup 2, the R/W circuit 3, and the signal processing circuit 4 to the determination section 7, which then determines whether the optical disk 1 is a writable optical disk (CD-R or CD-RW) or a read-only optical disk (CD-ROM) from the given information. In this case, the optical disk is writable, thus the determination section 7 informs the address detection section 5 and the main control section 9 that the optical disk is writable at step S2.

The main control section 9, which is informed that the optical disk 1 is writable, performs control for reading the PMA 23. To do this, the information in the PMA 23 is introduced into the address detection section 5, which then reads the last address A3 of the registered record addresses from the information in the PMA 23. The main control section 9 performs control for reading the outermost peripheral area of the optical disk 1 (the end area of the user data area). Resultantly, the address detection section 5 reads the last address A2 of the user data area at step S3.

Next, the address detection section 5 finds an intermediate address A4 between the addresses A3 and A2 from the last address A3 of the registered record addresses and the last address A2 of the user data area, and informs the main control section 9 of the found intermediate address A4 for reading the data at the address A4. As a result, the data at the address A4 is introduced into the address detection section 5, which then checks subcode in the introduced data and determines whether or not data is written into the address A4. At this time, the subcode indicates that no data is written.

Since no data is written into the address A4, the address detection section 5 finds an intermediate address A5 between the addresses A3 and A4 and informs the main control section 9 of the found intermediate address A5. As a result, the data at the address A5 is introduced into the address detection section 5, which then checks subcode in the introduced data. Also at this time, the subcode indicates that no data is written.

Since no data is written into the address A5, the address detection section 5 finds an intermediate address A6 between the addresses A3 and A5 and informs the main control section 9 of the found intermediate address A6. Thus, the data at the address A6 is introduced into the address detection section 5, which then checks subcode in the introduced data. At this time, the subcode indicates that data is written at steps S4 and S5.

Since data is written into the address A6, the address detection section 5 instructs the main control section 9 to read the data at the address A6 and later. Thus, the data at the address A6 and later is introduced into the address detection section 5, which then detects an address A7 based on the subcode of the introduced data at step S6, and outputs the detected address A7 to the instruction data calculation section 6.

Upon reception of the address A7, to find the value indicating the top address of the empty area 21 as the address instruction data corresponding to the top address, the instruction data calculation section 6 finds a value of adding one to the address A7, namely, finds a value of adding one frame to the minute, second, and frame values indicating the address A7, and sends the found value to the storage section 8 at step S7. The storage section 8 stores the value of the top address sent from the instruction data calculation section 6 as the address instruction data at step S8.

Next, the main control section 9 performs control for reading the TOC 24, stores the read TOC information therein, and checks the number of sessions at step S9. When the operation of step S9 terminates, the initialization operation accompanying the replacement of the optical disk 1 terminates. Thus, the main control section 9 informs the outside that a write or read instruction can be accepted.

As described above, the address instruction data is data indicating the top address of the empty area 21. Therefore, if a write instruction is given from the outside after the termination of the initialization operation, the main control section 9 reads the address instruction data (address) stored in the storage section 8 and perform control so as to write data starting at the read data. Resultantly, the data introduced over the signal line 11 is immediately written into the empty area 21 starting at the top address thereof.

Now assume that the optical disk 1 to replace is a CD-ROM. In this case, the data indicating the information of the type of the optical disk 1, etc., indicates a read-only optical disk. Thus, the determination section 7 informs the main control section 9 and the address detection section 5 that the optical disk is not writable and is read only. Therefore, the subsequent steps (S3–S8) for detecting the last address of the invisible data 22, etc., are skipped and the TOC information is read and the number of sessions is checked at step S9. Thus, if the optical disk 1 to replace is a read-only optical disk, the initialization operation time after the replacement of the optical disk 1 is shortened.

The optical disk device according to the invention is applied to an optical disk device for writing onto an optical disk to allow writing of invisible data whose record address is not registered in an address information area. The optical disk device comprises an address detection section, when an optical disk is replaced with another optical disk, for detecting the last address of the invisible data based on the last address of record addresses recorded in the address information area of the optical disk to replace and the last address of a user data area of the optical disk, an instruction data calculation section for calculating address instruction data corresponding to the top address of an empty area into which no data is written from the last address detected by the address detection section, and a storage section for storing the address instruction data found by the instruction data calculation section, wherein when writing is executed, it is executed starting at the top address corresponding to the address instruction data stored in the storage section. That is, when an optical disk is replaced, the address instruction data corresponding to the top address of an empty area is found and stored. When writing is executed, it is executed starting at the top address corresponding to the address instruction data stored in the storage section. Thus, increasing of a memory area for storing addresses where data can be written can be prevented and the write speed when viewed from the outside of the device can be prevented from lowering.

What is claimed is:

1. An optical disk device for writing data onto an optical disk, along spiral tracks, to allow writing of invisible data whose record address is not registered in an address information area in which record addresses of written data are registered, said optical disk device comprising:

an address detection section, when an optical disk is replaced with another optical disk, for detecting a last address of the invisible data based on a last address of record addresses recorded in the address information area of the optical disk to replace and a last address of a user data area of the optical disk;

an instruction data calculation section for calculating address instruction data corresponding to a top address of an empty area into which no data is written from the last address detected by said address detection section; and a storage section for storing the address instruction data found by said instruction data calculation section, wherein when writing is executed, it is executed starting at the top address corresponding to the address instruction data stored in said storage section.

2. The optical disk device as claimed in claim 1, further comprising a determination section for determining whether or not the optical disk to replace is a writable optical disk, wherein when said determination section determines that the optical disk to replace is a writable optical disk, said address detection section detects the last address and when said determination section determines that the optical disk to replace is not -a writable optical disk, said address detection section does not detect the last address.

3. The optical disk device as claimed in claim 2, wherein when said determination section determines that the optical disk to replace is a writable optical disk, detection of the last address of the invisible data, calculation of the address instruction data, and storing of the address instruction data are performed immediately.

* * * * *